United States Patent
Mattsson

(10) Patent No.: US 7,305,707 B2
(45) Date of Patent: *Dec. 4, 2007

(54) METHOD FOR INTRUSION DETECTION IN A DATABASE SYSTEM

(75) Inventor: Ulf Mattsson, Cos Cob, CT (US)

(73) Assignee: Protegrity Corporation, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 11/510,185

(22) Filed: Aug. 25, 2006

(65) Prior Publication Data

US 2007/0101425 A1    May 3, 2007

Related U.S. Application Data

(63) Continuation of application No. 10/034,996, filed on Dec. 28, 2001, now Pat. No. 7,120,933.

(30) Foreign Application Priority Data

Nov. 23, 2001  (EP) .................... 01127906

(51) Int. Cl.
  *G06F 11/00*  (2006.01)
  *G06F 11/30*  (2006.01)
  *G06F 1/00*  (2006.01)
  *G06F 7/00*  (2006.01)
  *G06F 13/00*  (2006.01)
  *G06F 15/00*  (2006.01)
(52) U.S. Cl. .................... 726/22; 713/187; 713/193
(58) Field of Classification Search .............. 726/22; 713/187, 193
See application file for complete search history.

(56) References Cited

U.S. PATENT DOCUMENTS

| 5,278,901 A | 1/1994 | Shieh et al. |
| 6,405,318 B1 * | 6/2002 | Rowland .................. 726/22 |
| 2002/0023227 A1 * | 2/2002 | Sheymov et al. ........... 713/201 |

FOREIGN PATENT DOCUMENTS

| EP | 0 999 490 A2 | 5/2000 |
| EP | 1 315 065 A1 | 5/2003 |
| JP | 2005189996 A * | 7/2005 |
| WO | WO-03/044638 A1 | 5/2003 |

OTHER PUBLICATIONS

Suresh N. Chari, Pau-Chen Cheng; "BlueBoX: A policy-driven, host-based intrusion detection system"; May 2003, ACM Transactions on Information and System Security (TISSEC), vol. 6, Issue 2, pp. 173-200.*

(Continued)

*Primary Examiner*—Matthew Smithers
*Assistant Examiner*—Courtney D Fields
(74) *Attorney, Agent, or Firm*—George W. Neuner; Steven M. Cohen; Edwards Angell Palmer & Dodge LLP

(57) ABSTRACT

A method for detecting intrusion in a database, managed by an access control system, includes defining at least one intrusion detection profile and associating each user with one of said profiles. Each profile includes at least one item access rate. Further, the method determines whether a result of a query exceeds any one of the item access rates defined in the profile associated with the user. In such a case, the access control system is notified to alter the user authorization, thereby making the received request an unauthorized request, before the result is transmitted to the user. Such a method allows for a real time prevention of intrusion by letting the intrusion detection process interact directly with the access control system, and change the user authority dynamically as a result of the detected intrusion.

22 Claims, 2 Drawing Sheets

OTHER PUBLICATIONS

Dorothy E. Denning, "*An Intrusion-Detection Model*", IEEE Transactions on Software Engineering, vol. SE-13, No. 2 (Los Alamitos, CA, Feb. 1987), pp. 222-232.

R. K. Bhattacharyya, "*Security of Network element Databases Against Increasing Threats of Intrusion via Operations Interfaces*", Proceedings: The Institute of Electrical and Electronics Engineers, 1988 International Carnahan Conferernce on Security Technology: Crime Countermeasures (Lexington, KY, Oct. 5-7, 1988), pp. 51-64.

Steven R. Snapp et al., "*A System for Distributed Intrusion Detection*", IEEE 1991, pp. 170-176.

International Search Report dated Feb. 24, 2003.

* cited by examiner

METHOD FOR INTRUSION DETECTION IN A DATABASE SYSTEM

This application is a continuation of and claims the benefit under 35 U.S.C. Section 120 of prior application U.S. Ser. No. 10/034,996, filed Dec. 28, 2001, now U.S. Pat. No. 7,120,933 which in turn claims priority under 35 U.S.C. Section 119 on European application number EPC 01127906.4, filed Nov. 23, 2001, the entire contents of each of these references is incorporated by reference herein.

FIELD OF THE INVENTION

The present invention generally relates to a method for detecting intrusion in a database managed by an access control system.

BACKGROUND OF THE INVENTION

In database security, it is a known problem to avoid attacks from persons who have access to a valid user-ID and password. Such persons cannot be denied access by the normal access control system, as they are in fact entitled to access to a certain extent. Such persons can be tempted to access improper amounts of data, by-passing the security. Solutions to this problem have been suggested:

Network-Based Detection

Network intrusion monitors are attached to a packet-filtering router or packet sniffer to detect suspicious behavior on a network as they occur. They look for signs that a network is being investigated for attack with a port scanner, that users are falling victim to known traps like .url or .lnk, or that the network is actually under an attack such as through SYN flooding or unauthorized attempts to gain root access (among other types of attacks). Based on user specifications, these monitors can then record the session and alert the administrator or, in some cases, reset the connection. Some examples of such tools include Cisco's NetRanger and ISS' RealSecure as well as some public domain products like Klaxon that focus on a narrower set of attacks.

Server-Based Detection

These tools analyze log, configuration and data files from individual servers as attacks occur, typically by placing some type of agent on the server and having the agent report to a central console. Some examples of these tools include Axent's OmniGuard Intrusion Detection (ITA), Security Dynamic's Kane Security Monitor and Centrax's eNTrax as well as some public domain tools that perform a much narrower set of functions like Tripwire which checks data integrity.

Tripwire will detect any modifications made to operating systems or user files and send alerts to ISS' RealSecure product. Real-Secure will then conduct another set of security checks to monitor and combat any intrusions.

Security Query and Reporting Tools

These tools query NOS logs and other related logs for security events or they glean logs for security trend data. Accordingly, they do not operate in real-time and rely on users asking the right questions of the right systems. A typical query might be how many failed authentication attempts have we had on these NT servers in the past two weeks." A few of them (e.g., SecurIT) perform firewall log analysis. Some examples of such tools include Bindview's EMS/NOSadmin and Enterprise Console, SecureIT's SecureVIEW and Security Dynamic's Kane Security Analyst.

Inference Detection

A variation of conventional intrusion detection is detection of specific patterns of information access, deemed to signify that an intrusion is taking place, even though the user is authorized to access the information. A method for such inference detection, i.e. a pattern oriented intrusion detection, is disclosed in U.S. Pat. No. 5,278,901 to Shieh et al.

None of these solutions are however entirely satisfactory. The primary drawback is that they all concentrate on already effected queries, providing at best an information that an attack has occurred.

SUMMARY OF THE INVENTION

It is an object of the present invention to provide a method and a system for intrusion detection.

According to the invention, this and other objects are achieved by a method including defining at least one intrusion detection profile. Each profile includes at least one item access rate. The method further can include associating each user with one of the profiles, receiving a query from a user, comparing a result of the query with the item access rates defined in the profile associated with the user, determining whether the query result exceeds the item access rates, and in that case notifying the access control system to alter the user authorization. Thereby the received request can be made to be an unauthorized request, before the result is transmitted to the user.

According to this method, the result of a query can be evaluated before it is transmitted to the user. This allows for a real time prevention of intrusion, where the attack is stopped even before it is completed. This is possible by letting the intrusion detection process interact directly with the access control system, and change the user authority dynamically as a result of the detected intrusion.

The item access rates can be defined based the number of rows a user may access from an item, e.g. a column in a database table, at one time, or over a certain period of time.

In a preferred embodiment, the method further includes accumulating results from performed queries in a record, and determining whether the accumulated results exceed any one of the item access rates. The effect is that on one hand, a single query exceeding the allowed limit can be prevented, but so can a number of smaller queries, each one on its on being allowed, but when accumulated not being allowed.

It should be noted that the accepted item access rates are not necessarily restricted to only one user. On the contrary, it is possible to associate an item access rate to a group of users, such as users belonging to the same access role (which defines the user's level of security), or connected to the same server. The result will be restricting the queries accepted from a group of users at one time or over a period of time.

The user, role and server entities are not exclusive of other entities which might benefit from a security policy.

According to an embodiment of the invention, items subject to item access rates are marked in the database, so that any query concerning said items automatically can trigger the intrusion detection process. This is especially advantageous if only a few items are intrusion sensitive, in which case most queries are not directed to such items. The selective activation of the intrusion detection will then save time and processor power.

According to another embodiment of the invention, the intrusion detection policy further includes at least one inference pattern, and results from performed queries are accumulated in a record, which is compared to the inference pattern, in order to determine whether a combination of accesses in said record match said inference policy, and in that case the access control system is notified to alter the user authorization, thereby making the received request an unauthorized request, before said result is transmitted to the user.

This embodiment provides a second type of intrusion detection, based on inference patterns, again resulting in a real time prevention of intrusion.

BRIEF DESCRIPTION OF THE DRAWINGS

These and other aspects of the invention will be apparent from the preferred embodiments more clearly described with reference to the appended drawings, wherein.

DETAILED DESCRIPTION OF THE PREFERRED EMBODIMENTS

Figure 1:
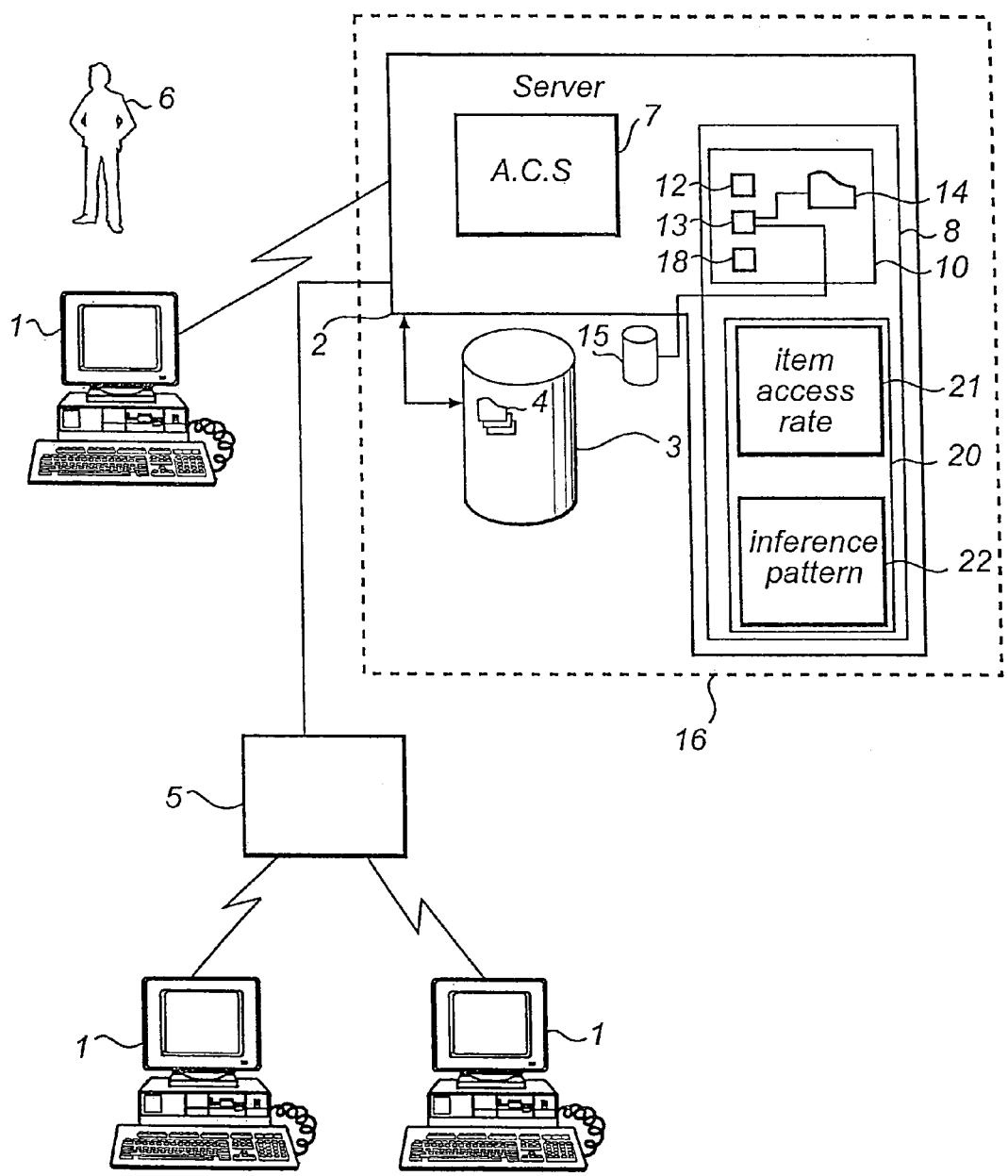
FIG. 1 shows a database environment in which an embodiment of the present invention is implemented.

The present invention may be implemented in an environment of the type illustrated in FIG. 1. The environment includes a number of clients 1, connected to a server 2, e.g. a Secure.Data™ server from Protegrity, providing access to a database 3 with encrypted data 4. Several clients 1 can be connected to an intermediate server 5 (a proxy server), in which case we have a so called three tier application.

Users 6 use the clients 1 to access information 4 in the database 3. In order to verify and authorize attempted access, an access control system (ACS) 7 is implemented, for example Secure.Server™ from Protegrity.

The server is associated with an intrusion detection module 10, comprising software components 12, 13 and 18 for performing the method according to the invention.

Although the intrusion detection module 10 here is described as a separate software module, its components can be incorporated in the server software 2, for example in a security administration system (SAS) 8, like Secure.Manager™ from Protegrity. It can reside in the server hardware 16, or in a separate hardware unit.

A first component 12 of the intrusion detection module 10 enables marking of some or all data items (e.g. columns in tables) in the database, thereby indicating that these items should be monitored during the intrusion detection process, as described below.

A second component 13 of the intrusion detection module 10 is adapted to store all results from queries including marked items, thereby creating a record 14 of accumulated access of marked items. If advantageous, the record can be kept in a separate log file 15, for long term storage, accumulating data access over a longer period of time.

The server 2 further has access to a plurality of security policies 20, preferably one for each user, one for each defined security role, or the like. These security policies can be stored in the security administration system 8, but also be stored outside the server. Each policy 20 includes one or several item access rates 21 and optionally an inference pattern 22.

An item access rate 21 defines the maximum number of rows of the selected item (e.g. column of a table) that a given user, role or server may access during a given period of time. The period of time can be defined as one single query, but can also be an accumulation of queries during a period of time. Preferably, a separate item access rate is defined for at least each item that has been marked in the database 3 by the component 12 of the intrusion detection module 10.

An inference pattern 22 defines a plurality of items (columns of certain tables) that when accesses in combination may expose unauthorized information. This means that an attempt by a user, role or server to access certain quantities of information from items in an inference pattern during a given period of time (e.g. in one request) implies that an intrusion is taking place, even if the associated item access rates have not been exceeded. For further information about the inference concept of intrusion, see U.S. Pat. No. 5,278,901.

Returning to the intrusion detection module 10, a third component 18 is adapted to compare the result of a query with an item access rate 21 and an inference pattern 22. The component 18 can also compare the access rates 21 and inference patterns 22 with accumulated results, stored in the record 14 or log file 15.

When a user tries to access a database, the access control system 7 completes an authority check of the user. Different routines can be used, including automatic authorization by detecting IP-address, or a standard log-in routine. In one embodiment, the authorized user will only have access to items defined in his role, i.e. the table columns that the user is cleared for and uses in his/her work. The access control system 7 then continually monitors the user activity, and prevents the user from accessing columns he/she is not cleared for. This process is described in detail in WO 97/49211, hereby incorporated by reference.

The intrusion detection according to the described embodiment of the invention is directed toward the situation where a user, authorized to access certain items, abuses this authority and tries to obtain information broaching the security policy of the database owner. The intrusion detection is divided into two different stages, a real time stage and an à posteriori analysis stage.

Figure 2:
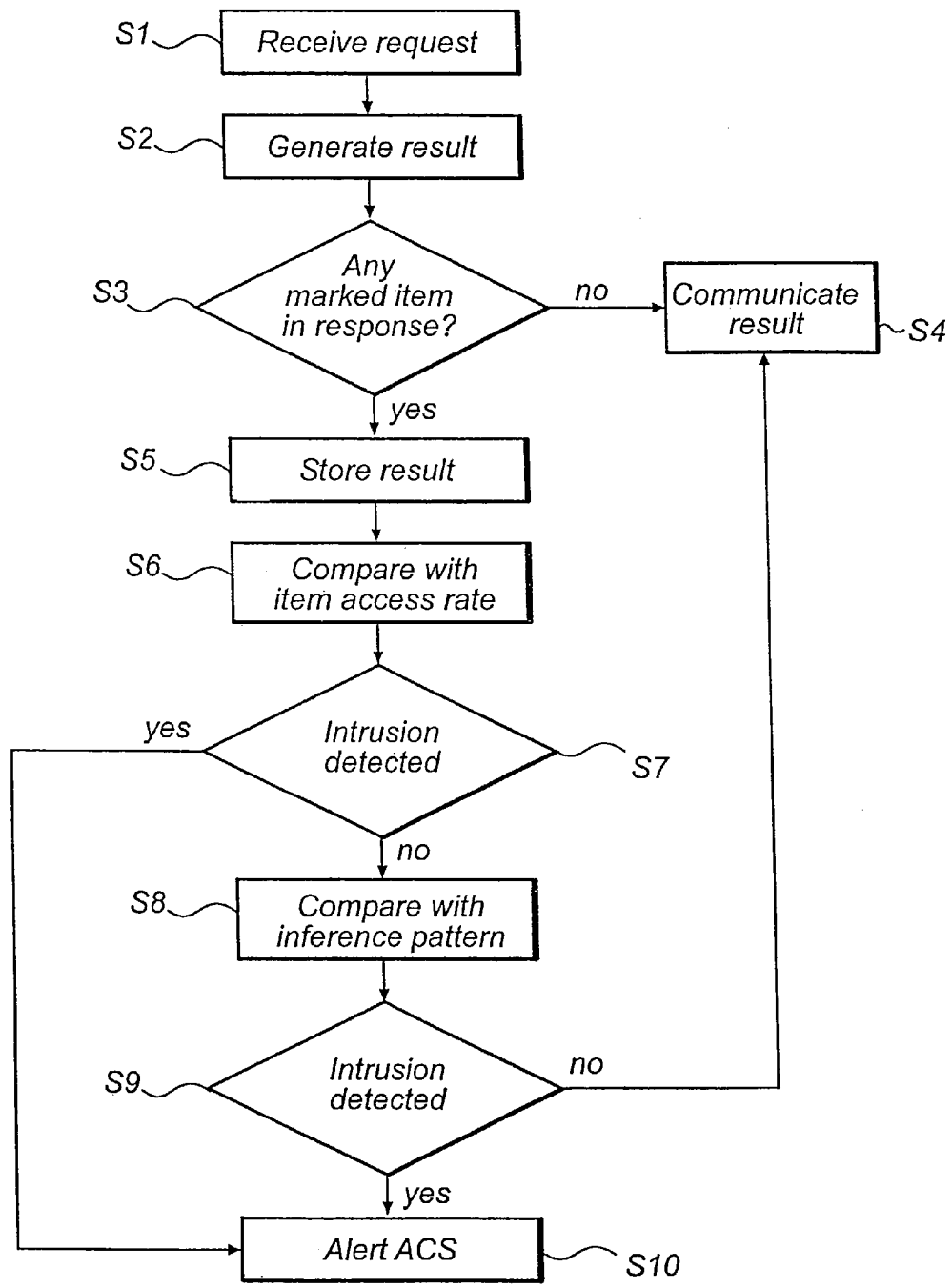
FIG. 2 is a schematic flowchart of an embodiment of the method according to the invention.

Real Time:

With reference to FIG. 2, a request is received by the server in step S1, resulting in the generation of a result in step S2, i.e. a number of selected rows from one or several table columns. The software component 12 determines (step S3) if any items in the result are marked for monitoring in the database. If no marked items are included in the result, the result is communicated to the user in a standard way (step S4). If, however, mared items are included in the result, the intrusion detection component 13 stores the query result, or at least those parts referring to the marked items, in the record 14, and the program control initiates the intrusion detection (step S6-S10).

First, in step S6, the intrusion detection component 18 compares the current query result and the updated record 14 with the item access rate 21 included in the security policy associated with the current user, the role that the user belongs to, or the server the user is connected to. Note that only item access rates 21 associated with the marked items comprised in the current result need to be compared.

If the current query result or accumulated record 14 includes a number of rows exceeding a particular item access rate 21, such a request will be classified as an intrusion (step S7), and the access control system 7 will be alerted (step S10).

Secondly, in step S8, if no item access rate is exceeded, the intrusion detection process compares the query result and accumulated record 14 with any inference pattern included in the relevant security policy. If the result includes a combination of items that match the defined inference pattern, such a request will also be classified as an intrusion (step S9), and the access control system will be alerted (step S10).

If no intrusion is found in step S7 nor step S9, the program control advances to step S4 and communicates the result to the user.

Upon an ACS alert (step S10), the access control system 7 is arranged to immediately alter the user authorization, thereby making the submitted request unauthorized. This can be effected easily, for example if the ACS 7 is part of the Secure.Data™ server from Protegrity.

For the user, the request, or at least parts of the request directed to items for which the item access rate was exceeded, will thus appear to be unauthorized, even though authority was initially granted by the access control system 7.

In addition to the immediate and dynamic alteration of the access control system 7, other measures can be taken depending on the seriousness of the intrusion, such as sending an alarm to e.g. the administrator, or shutting down the entire database. The server software 11 can send an alarm to a waiting process that a potential breach of security is occurring.

Long Term Analysis:

The query result can also be stored in the log file 15 by the intrusion detection module, as described above. The log file 15, which thus contains accumulated query results from a defined time period, can also be compared to the inference patterns 22 in the security profiles 20 of users, roles or servers, this time in a "after the event" type analysis.

Even though such an analysis cannot prevent the intrusion from taking place, it may serve as intelligence gathering, improving the possibilities of handling intrusion problems. While the real time protection is most efficient when it comes to preventing security breaches, the long term analysis can be more in depth, and more complex, as time is no longer a critical factor.

Many three-tier applications (e.g. connections with a proxy 5) authenticate users to the middle tier 5, and then the TP monitor or application server in the middle tier connects to the database 3 as a super-privileged user, and does all activity on behalf of all users 6 using the clients 1. Preferably, the invention is implemented in a system, for example Secure.Data™ from Protegrity, in which the identity of the real client is preserved over the middle tier thereby enabling enforcement of "least privilege" through a middle tier. The intrusion detection module 10 therefore can audit access requested both by the logged-in user who initiated the connection (e.g., the TP monitor), and the user on whose behalf an action is taken. Audit records capture both the user taking the action and the user on whose behalf the action was taken. Auditing user activity, whether users are connected through a middle tier or directly to the data server, enhances user accountability, and thus the overall security of multi-tier systems. Audit records can be sent to the database audit trail or the operating system's audit trail, when the operating system is capable of receiving them. This option, coupled with the broad selection of audit options and the ability to customize auditing with triggers or stored procedures, provides the flexibility of implementing an auditing scheme that suits any specific business needs.

The invention being thus described, it will be obvious that the same may be varied in many ways. Such variations are not to be regarded as a departure from the spirit and scope of the invention, and all such modifications as would be obvious to one of ordinary skill in the art are intended to be included within the scope of the following claims.

What is claimed is:

1. A method for detecting intrusion in a database, comprising:
   defining at least one intrusion detection policy for the database;
   associating each user with one of the defined policies;
   receiving a database query from a user;
   determining if the results of the query violate the intrusion detection policy; and
   altering the user's authorization if the intrusion detection policy has been violated.

2. The method of claim 1, wherein the at least one intrusion detection policy includes a set of item access rates.

3. The method of claim 2, wherein at least one of the item access rates includes a definition of a number of rows that may be accessed in a predetermined period of time.

4. The method of claim 2, wherein at least one of the item access rates includes a definition of a number of rows that a group of users may access at one time.

5. The method of claim 2, wherein at least one of the item access rates includes a definition of a number of rows that a user may access over a period of time.

6. The method of claim 2, wherein at least one of the item access rates includes a definition of a number of rows that a group of users may access over a period of time.

7. The method of claim 2, wherein at least one of the item access rates includes a definition of a number of rows that a user may access at one time.

8. The method of claim 2, wherein the at least one intrusion detection policy further includes at least one inference pattern.

9. The method of claim 1, further comprising:
   accumulating results from performed database queries in a record;
   determining if the accumulated results violate the intrusion detection policy; and
   altering the user's authorization if the intrusion detection policy has been violated.

10. The method of claim 1, wherein the intrusion detection policy further includes at least one inference pattern.

11. The method of claim 10, further comprising:
    accumulating results from performed database queries in a record;
    determining if the record matches the at least one inference pattern;
    altering the user's authorization if the record matches the at least one inference pattern.

12. A method for detecting intrusion in a database for a plurality of users, comprising:
    defining more than one intrusion detection policy for the database;
    associating each user with one of the defined intrusion detection policies;
    receiving a database query from a first user;
    determining if a result of the database query violates the intrusion detection policy associated with the first user; and
    altering the first user's authorization if the intrusion detection policy associated with the first user has been violated.

13. The method of claim 12, wherein each intrusion detection policy includes a set of item access rates.

14. The method of claim 13, wherein at least one of the item access rates includes a definition of a number of rows that may be accessed in a predetermined period of time.

15. The method of claim 13, wherein at least one of the item access rates includes a definition of a number of rows that the first user may access at one time.

16. The method of claim 13, wherein at least one of the item access rates includes a definition of a number of rows that a group of more than one of the users may access at one time.

17. The method of claim 13, wherein at least one of the item access rates includes a definition of a number of rows that the first user may access over a period of time.

18. The method of claim 13, wherein at least one of the item access rates includes a definition of a number of rows that a group of more than one of the users may access over a period of time.

19. The method of claim 13, wherein each intrusion detection policy further includes at least one inference pattern.

20. The method of claim 12, further comprising the steps of:
   accumulating in a result record, at least one result of the database query from the first user;
   determining if the result record violates the intrusion detection policy associated with the first user; and
   altering the first user's authorization if the intrusion detection policy associated with the first user has been violated.

21. The method of claim 12, wherein each intrusion detection policy further includes at least one inference pattern.

22. The method of claim 21, further comprising to step of:
   determining if the result record matches the at least one inference pattern;
   altering the first user's authorization if the result record matches the at least one inference pattern.

* * * * *